(12) United States Patent
Baker et al.

(10) Patent No.: US 11,113,766 B1
(45) Date of Patent: Sep. 7, 2021

(54) METHOD AND SYSTEM FOR AUTOMATICALLY DETECTING A FENCE

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/424,655

(22) Filed: May 29, 2019

Related U.S. Application Data

(60) Provisional application No. 62/753,113, filed on Oct. 31, 2018.

(51) Int. Cl.
| | |
|---|---|
| *G06K 9/62* | (2006.01) |
| *G06K 9/00* | (2006.01) |
| *G06Q 40/08* | (2012.01) |
| *H04N 7/18* | (2006.01) |
| *G06N 20/00* | (2019.01) |

(52) U.S. Cl.
CPC ......... *G06Q 40/08* (2013.01); *G06K 9/00201* (2013.01); *G06K 9/00536* (2013.01); *G06K 9/6277* (2013.01); *G06N 20/00* (2019.01); *H04N 7/185* (2013.01)

(58) Field of Classification Search
CPC ........ G06Q 40/08; G06Q 40/02; G06Q 10/10; G06K 9/00; G06K 9/6268; G06N 20/20
See application file for complete search history.

(56) References Cited

U.S. PATENT DOCUMENTS

| | | | |
|---|---|---|---|
| 10,062,118 B1* | 8/2018 | Bernstein | G06Q 40/08 |
| 10,565,658 B1* | 2/2020 | Harvey | G06T 17/20 |
| 2018/0089763 A1* | 3/2018 | Okazaki | G06K 9/00671 |
| 2021/0089839 A1* | 3/2021 | Okazaki | G06K 9/6268 |

* cited by examiner

*Primary Examiner* — Olabode Akintola
*Assistant Examiner* — Suckhwan Chon
(74) *Attorney, Agent, or Firm* — Plumsea Law Group, LLC

(57) ABSTRACT

A system and method for automatically detecting fences on a premises are disclosed. The system and method use image data gathered from one or more sources, including satellite images and images from ground-based cameras. The images are analyzed using a machine learning system to detect a fence. The system and method can also automatically update a policy holder's insurance policy to reflect the presence of a fence on the premises.

20 Claims, 11 Drawing Sheets

METHOD AND SYSTEM FOR AUTOMATICALLY DETECTING A FENCE

CROSS-REFERENCE TO RELATED APPLICATIONS

This application claims the benefit of Provisional Patent Application No. 62/753,113 filed Oct. 31, 2018, and titled "Method and System for Automatically Detecting a Fence," which is incorporated by reference herein in its entirety.

TECHNICAL FIELD

The present disclosure generally relates to methods and systems for automatically detecting fences, and in particular to detecting fences using machine learning.

BACKGROUND

Home owners are often required to have home owner's insurance to cover damage or losses to the home or its contents. To calculate a home owner's insurance premium, an insurance provider may consider a variety of factors. These can include the cost of the home, the age of the home, its geographic location, susceptibility to various kinds of natural disasters (such as tornados, hurricanes, flooding and earthquakes), as well as other factors.

Having a fence on the premises may act as a deterrent for theft, as well as help mitigate against other potential liabilities. Some insurance providers may therefore offer discounted premiums to home owners with fences. However, conventional discount programs rely on home owners self-reporting the presence of fences. Insurance providers often do not have a cost-effective way to confirm that the home owner has a fence.

There is a need in the art for a system and method that addresses the shortcomings discussed above.

SUMMARY

In one aspect, a method of determining if a premises has a fence and modifying an insurance policy associated with the premises is disclosed. The method includes steps of retrieving at least one image from a camera disposed proximally to the premises and analyzing the at least one image using a machine learning system, where an output of the machine learning system includes a fence classification parameter. The method also includes steps of determining if the premises has a fence based on the fence classification parameter and modifying the insurance policy when a fence is detected.

In another aspect, a method of determining if a premises has a fence and modifying an insurance policy associated with the premises is disclosed. The method includes a step of retrieving at least one image from a satellite images database, where the at least one image corresponds to the premises. The method further includes the steps of analyzing the at least one image using a machine learning system, wherein an output of the machine learning system includes a fence classification parameter, determining if the property has a fence based on the fence classification parameter, and modifying the insurance policy when a fence is detected.

In another aspect, a method of determining if a premises has a fence and modifying an insurance policy associated with the premises is disclosed, the method including steps of retrieving information about the premises, the information including a list of available sensory devices, and determining if the list of sensory devices includes a camera. When the list of sensory devices includes a camera, the method includes retrieving images from the camera and analyzing the images from the camera to determine if the premises has a fence. When the list of sensory devices does not include a camera, the method includes retrieving satellite images of the premises from a satellite images database and analyzing the satellite images to determine if the premises has a fence.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide system and methods for automatically detecting the presence of a fence on a premises using image analysis, and optionally, updating an insurance policy associated with the premises to reflect that the premises has a fence. The system and method can be used to detect fences from ground-based imagery, such as images from a security camera. The system and method can also be used to detect fences from satellite imagery, which may be retrieved from a satellite images database. The images can be analyzed using one or more machine learning methods to classify a premises as having a fence or not having a fence. The system and method also allow an insurance policy holder to be contacted when an insurance policy associated with the premises is updated to reflect the presence of the fence. By automatically identifying the presence of a fence, the system and method can help reduce or eliminate the cost to the provider of sending a representative to inspect the premises and confirm that a fence is present. The system and method also help improve the customer experience by reducing the amount of information that a home owner must provide when opening a new policy or updating an existing policy.

Figure 1:
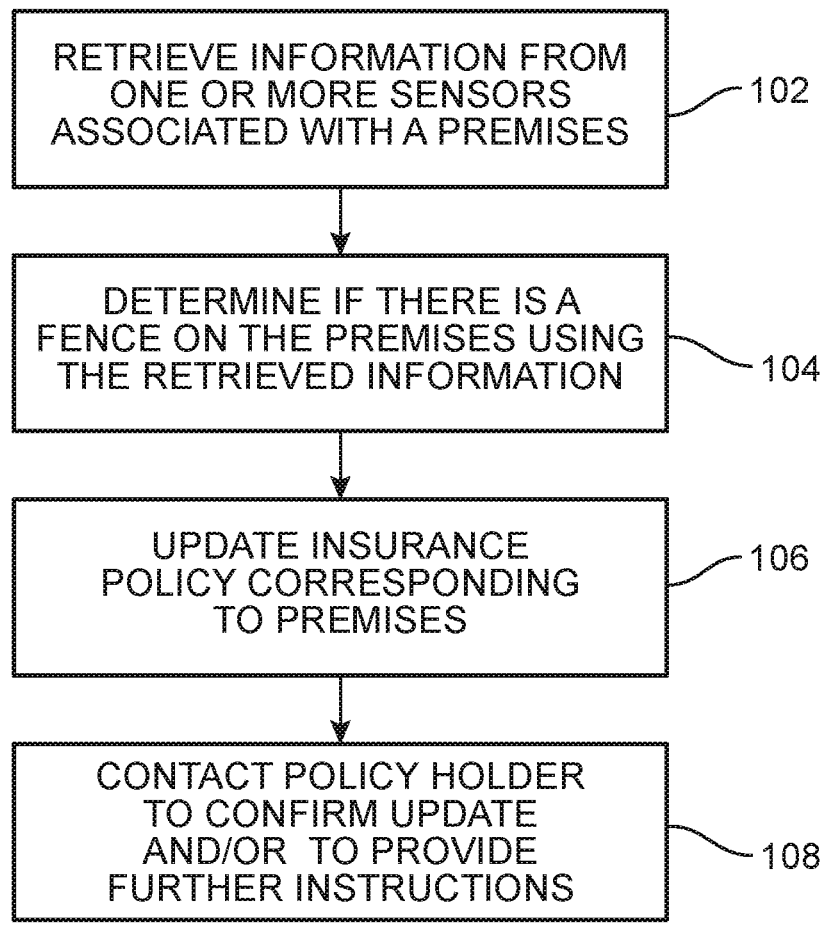
FIG. 1 is a schematic view of a process for detecting a fence using information from sensors, according to an embodiment.

FIG. 1 is a schematic view of a process for detecting if a fence is present on a premises and updating an insurance policy associated with the premises, according to an embodiment. As used herein, the term "premises" refers to a plot of land and any buildings or other structures on the land.

In the present embodiment, one or more of the steps in this process may be performed by an insurance provider. The term "insurance provider" (or simply "provider"), as used herein refers to any institutions or companies that provide insurance products. Insurance products can include home owner's insurance, renter's insurance and/or commercial property insurance. An insurance product may be characterized by an insurance policy, which is a contract between an insurance provider (the "insurer") and a policy holder (the "insured"). In some cases, the policy holder may be an owner, or tenant, of a premises.

In step 102, a provider may retrieve information from one or more sensors associated with a premises. The type of sensors could vary, and may generally include optical based sensors (for example, cameras), audible based sensors, tactile based sensors as well as electrical sensors, temperature sensors, humidity sensors, motion sensors, as well as other suitable sensors. Next, in step 104, the information from the one or more sensors may be used to determine if there is a fence on the premises. Based on the determination of step 104, the insurance policy corresponding to the premises may be updated in step 106. In some cases, when a fence is detected, the insurance policy could be adjusted so that the policy holder pays a lower premium and/or deductible, to reflect the decreased risk for loss or damage. As an optional step 108, a provider may contact the policy holder. The policy holder may be informed of the recent adjustment in the insurance policy. In situations where no fence is detected, a provider may optionally contact the policy holder to suggest they install a fence to reduce their risk of damage/loss and lower insurance premiums and/or deductibles.

Figure 2:
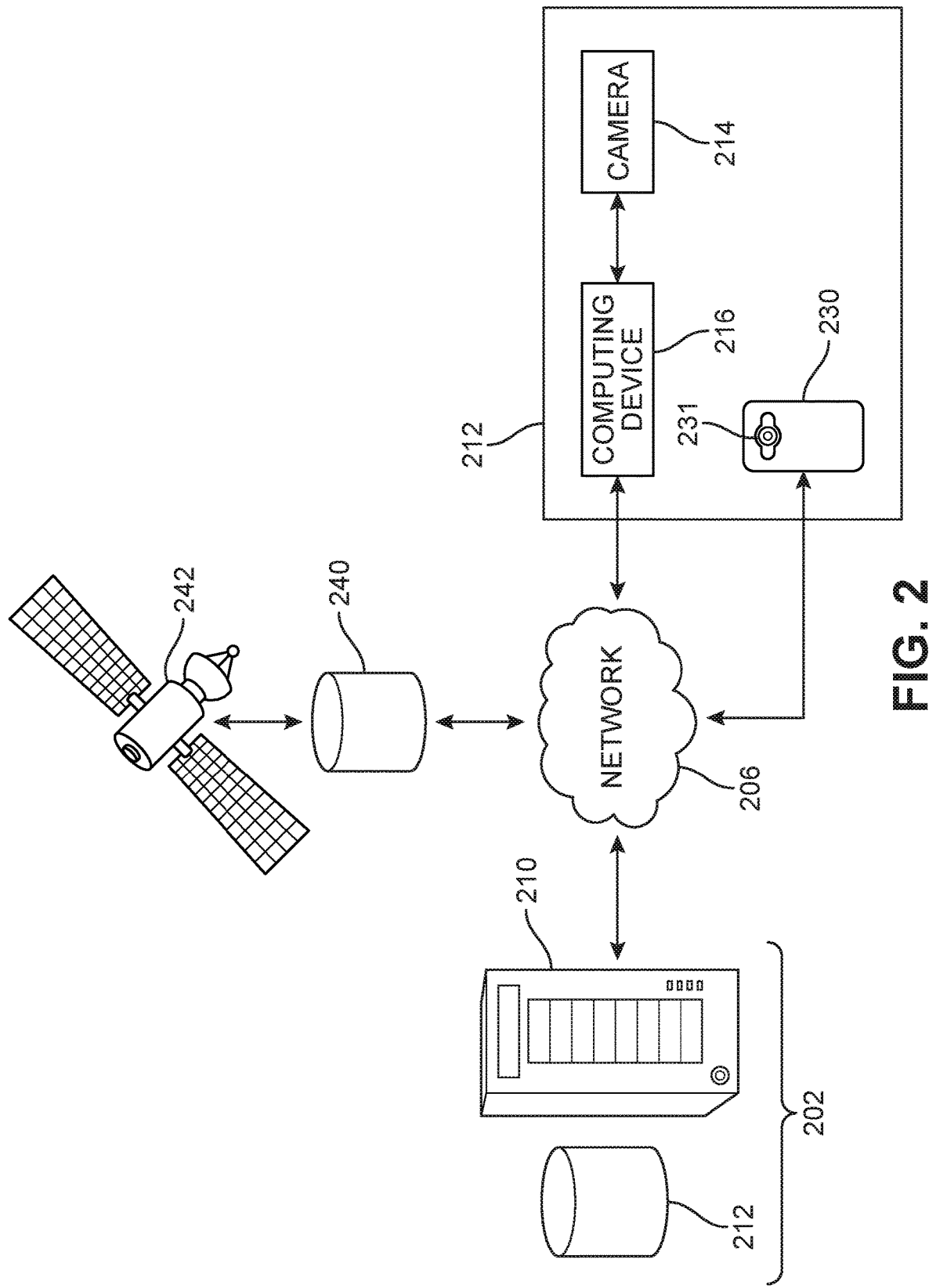
FIG. 2 is a schematic view of a system for receiving sensed information and analyzing the information to detect fences, according to an embodiment.

FIG. 2 is a schematic view of many of the systems and devices that may be used to extract sensory data about a premises. Referring to FIG. 2, provider 200 may comprise a centralized computer system 202. The term "computer system" refers to the computing resources of a single computer, the partial computing resources of a single computer, a plurality of computers communicating with one another, or a network of remote servers. In an exemplary embodiment, computer system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

Provider 200, including computer system 202, may communicate with one or more sensory devices located at premises 212. Here, premises 212 may be associated with a particular home, apartment, building or other kind of property that is insured by provider 200. Referring to FIG. 2, a home could include a connected camera 214. Camera 214 may be connected to a computing device 216 located at premises 212. Computing device 216 may include a processor, storage and a communications module for communicating with computer system 202. In some cases, communication between computing device 216 and computer system 202 may occur over a network 206.

Camera 214 may be any kind of camera associated with premises 212. In some embodiments, camera 214 could be a security camera. In some cases, camera 214 could be externally mounted on a house or other building to help monitor the outside area of the premises (for example, a front and/or backyard of the premises).

Camera 214 may be a digital camera capable of transmitting image information to computing device 216. The image information could comprise still photographs or video. Moreover, the image information could be stored in any format including, but not limited to: the JPEG format, the TIFF format, the GIF format, the PNG format, the IMG format, the PDF format as well as other suitable formats. Image information could also be comprised of video data. Examples of video data formats include, but are not limited to: the Flash video format, the AVI format, the Quicktime format, the MP4 format, the MPG format, the Windows Media Video format as well as other suitable formats.

Provider 200 could also communicate with a user device 230, which may be carried by onto premises 212 by a policy holder or other user of premises 212. User device 230 may comprise a computer system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls.

User device 230 may include a camera 231. Camera 231 may be a digital camera that can capture still photographic images or video. Camera 231 may be capable of storing and transferring image information in any known formats, including those discussed above.

In the exemplary embodiment of FIG. 2, user device 230 comprises a mobile device. Specifically, user device 230 comprises smartphone. In other embodiments, user device 230 could be a tablet computing device. In still other embodiments, however, a remote device could comprise a laptop, a desktop computer, or similar kind of device.

Both user device 230 and computing device 216 could operate in a client-server relationship with computer system 202 of provider 200. For example, computer system 202 may include a server that communicates with user device 230 as well as computer device 216 over network 206. User device 230 and/or computing device 216 may run client software that control cameras, retrieve image information from those cameras, store image information and/or send image information to computer system 202 for analysis. In addition, messages may be automatically sent to user device 230 to inform them of changes to their policy and/or to request further action regarding their policy.

Provider 200 may also be configured to retrieve satellite image information gathered by satellites. In the embodiment shown in FIG. 2, computing system 202 of provider 200 may retrieve image information from a satellite images database 240. Satellite images database 240 may store a plurality of satellite images that are captured by one or more satellites 242. Satellite images may be captured by government and commercially operated imaging satellites, such as the satellites operated by the Landsat program, and made publicly available through third party vendors. In some cases, satellite images could be provided along with other geospatial information.

Figure 3:
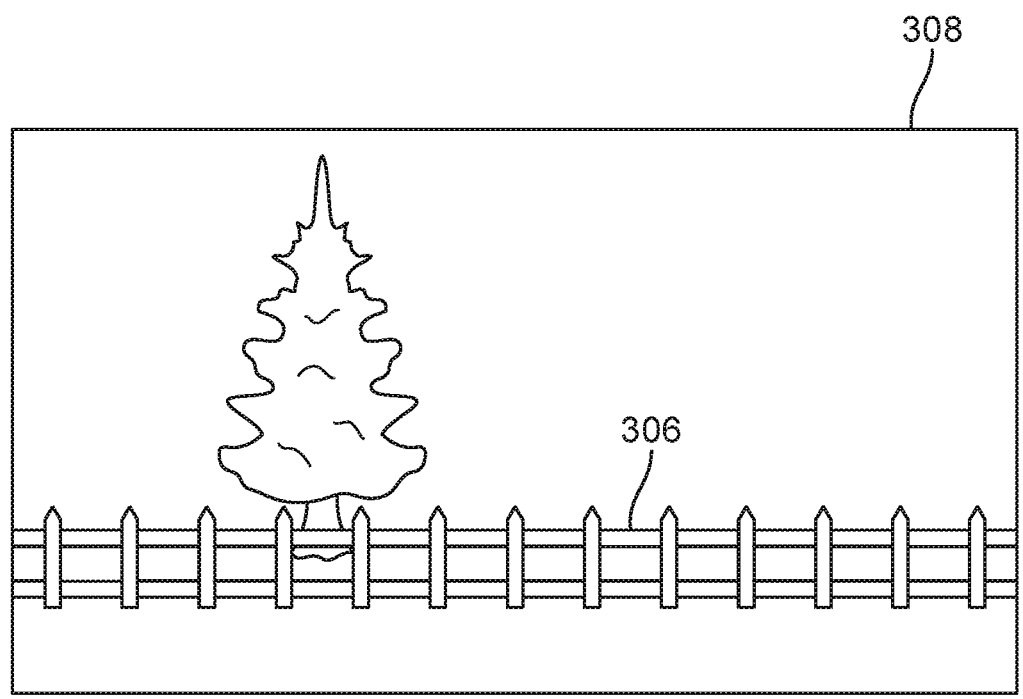
FIG. 3 is a schematic view of a configuration where images are captured using cameras near the ground, according to an embodiment.
Figure 3:
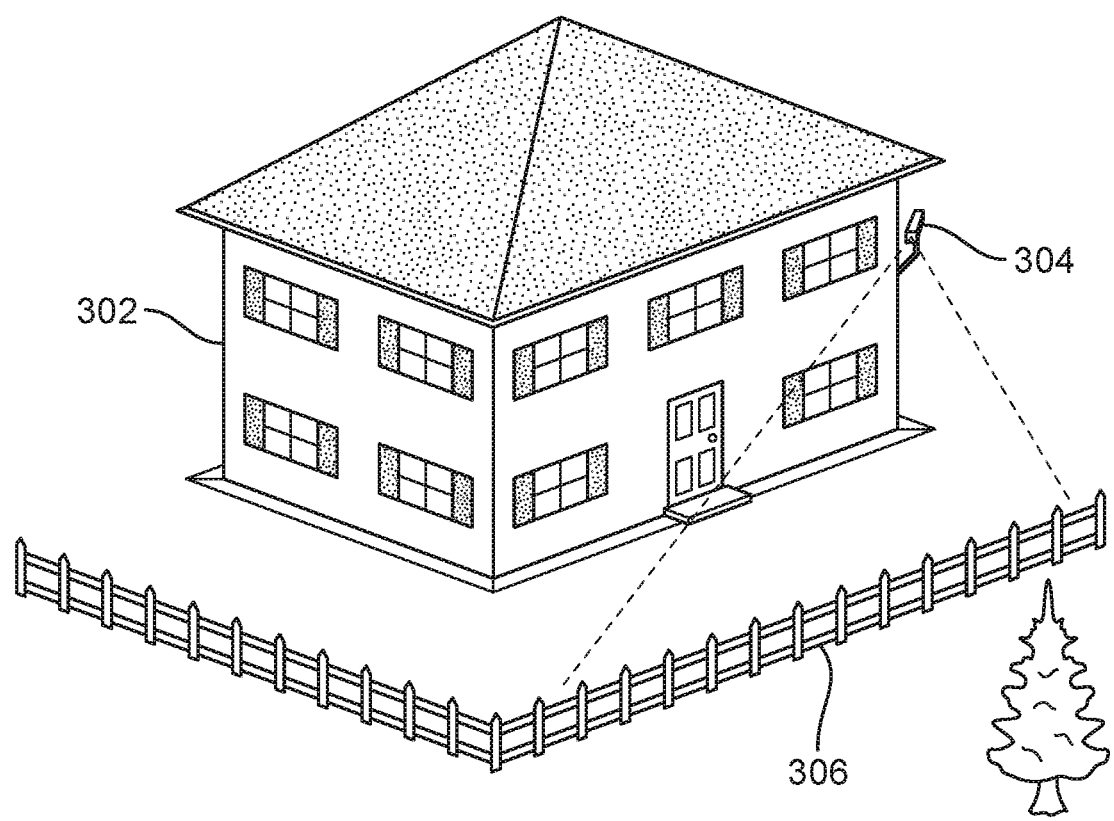

FIG. 3 depicts a schematic configuration in which a security camera 304 is externally mounted to a structure 302 (such as a house or commercial building). Camera 304 may be positioned to monitor a front or rear yard around structure 302. As seen in FIG. 3, a fence 306 is located in the viewing area of camera 304 and may be clearly visible in an exemplary image 308. In general, a camera used to capture images of a premises for detecting a fence may be disposed proximally to the premises. As used herein, proximally to the premises may mean either on the premises, or within view of the premises.

Figure 4:
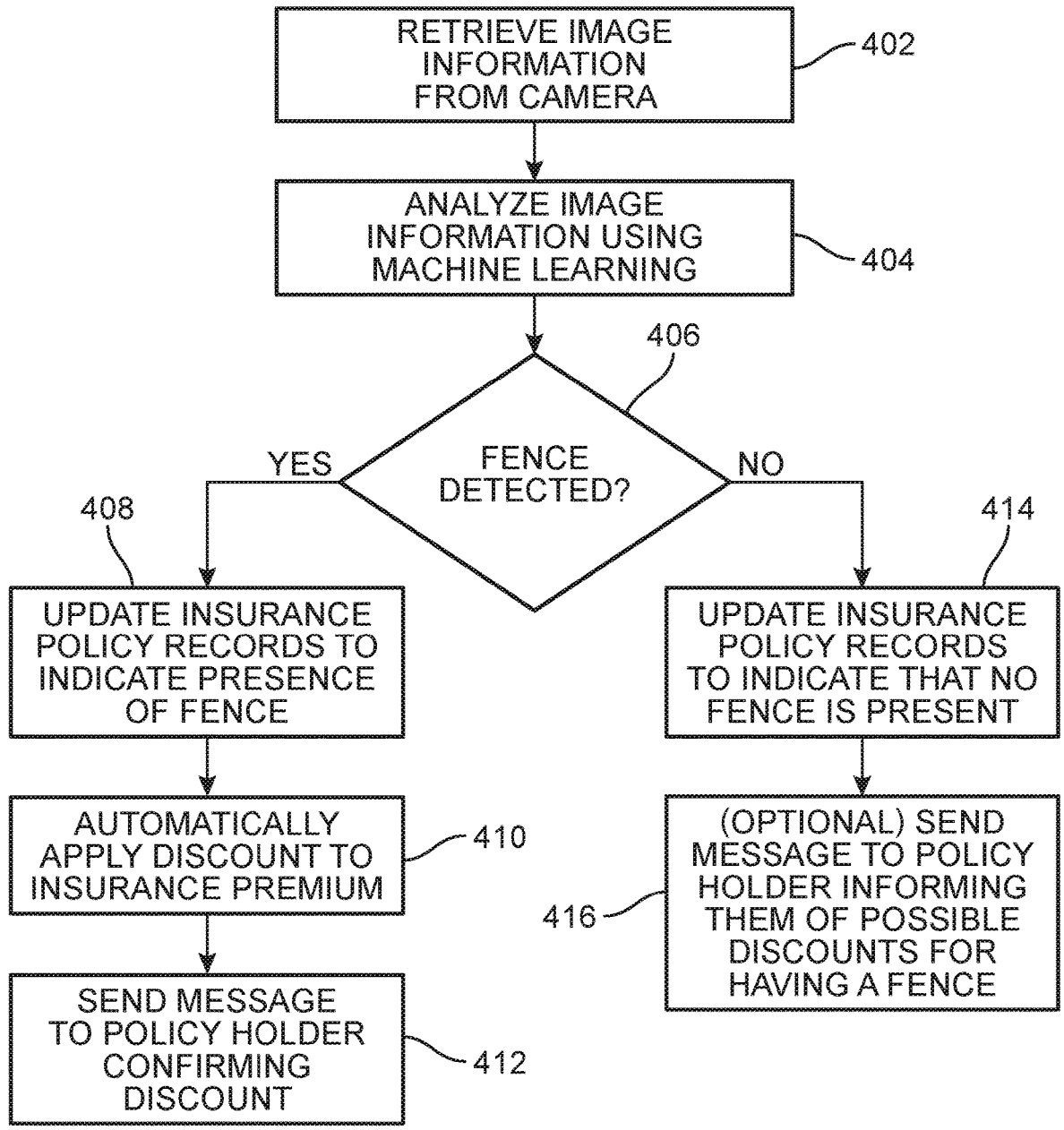
FIG. 4 is a schematic view of a process for gathering images from a camera as in FIG. 3 and processing the images to detect fences, according to an embodiment.

FIG. 4 is a schematic process for automatically determining if a premises has a fence and updating an insurance policy accordingly. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

In step 402, a computing system may retrieve image information from a camera located on the premises. For example, image information captured by a camera (e.g., camera 214 of FIG. 2) could be sent directly to a provider over a network (e.g., network 206). In some other cases, image information could be relayed to a provider through an intermediate computing device (e.g., computing device 216). Alternatively, in another embodiment, a computing system may retrieve image information from a camera 231 of a user device 230.

Next, in step 404, image information could be analyzed using one or more machine learning algorithms. Techniques from artificial intelligence and machine learning could be used for image detection and/or recognition as well as for other purposes. For example, the embodiments could make use of any methods from the field of machine (or computer) vision including methods, techniques, or algorithms in machine vision and/or feature detection to identify and classify objects. Embodiments may use any known image processing methods such as stitching/registration, filtering, thresholding, pixel counting, segmentation, edge detection, color analysis, blob detection, pattern recognition or template matching, optical character recognition as well as other known methods. Embodiments may also use known techniques in deep learning to help process and classify objects within image data. These techniques include various kinds of deep neural networks. In some cases, embodiments may use one or more kinds of convolutional deep neural networks (CNNs) that are commonly used in image recognition and other areas of machine vision.

In step 406, the computing system determines if a fence has been detected. In some embodiments, the output of the analysis performed during step 404 can be characterized as a "fence classification parameter." This parameter could represent an explicit classification category, such as "fence detected," or "no fence detected." Alternatively, this parameter could be a number (such as a decimal or percentage) representing the probability that a fence has been detected. For example, if a classification algorithm outputs the number 0.8, this may indicate that there is an 80% chance that a fence has been detected in the images taken of the premises. A suitable classification parameter can be selected according to the type of machine learning algorithm that is used.

If a fence has been detected, the computing system may proceed to step 408. At step 408, the computing system can update insurance policy records associated with the premises to indicate the presence of a fence. Next, in step 410, the computing system can automatically apply a discount to the insurance premium for the insurance policy. In some other embodiments, this step may not be automatic and could require further review by a representative of the provider. Next, in step 412, the computing system could send a message to the policy holder to inform them of the recently applied discount and/or changes to their insurance policy records. Alternatively, in some cases, a message could be automatically sent to a representative of the provider to let the know that further review is needed to apply a discount to the insurance premium.

If, in step 406, the computing system determines that no fence has been detected, the computing system may proceed to step 414. At step 408, the computing system may update the insurance policy to indicate that no fence is present. As an optional next step, in step 416, the computing system could automatically send the policy holder a message informing them of potential discounts that are available for having a fence on the premises. The messages could take the form of text messages, emails, physical mail, or any other suitable form of contacting a policy holder. In some embodiments, the message could be pushed to a mobile device through an application supported by the insurance provider.

It may be appreciated that a similar process to the one described in FIG. 4 may be used to confirm that a policy holder has a fence in the event that the policy holder has previously indicated that there is a fence on the premises. In such a process, if no fence is detected, the process could include a step of automatically raising the policy holder's insurance premium if they've previously been given a discount for having a fence. Thus, the exemplary systems and methods could be used to both identify policy holders that haven't been receiving a discount, but who may be eligible because they have a fence. The exemplary systems and methods could also be used to identify policy holders that have been receiving a discount for having a fence even though they don't actually have one. This latter case could occur from either fraud, or could be unintentional (i.e., a policy holder accidentally checked a box about having a fence on a new insurance policy enrollment form).

In another configuration, ground based images could be captured by a camera on a user device (e.g., camera 231 on user device 230). In some cases, a provider could explicitly request that a user takes pictures of the premises so that the images can be analyzed to determine if there is a fence, rather than relying on users to self-report if they have a fence. The image information captured on the user's phone could then be automatically analyzed using the processed described above, rather than requiring that a representative of the provider take time to open the images and inspect them manually.

Figure 5:
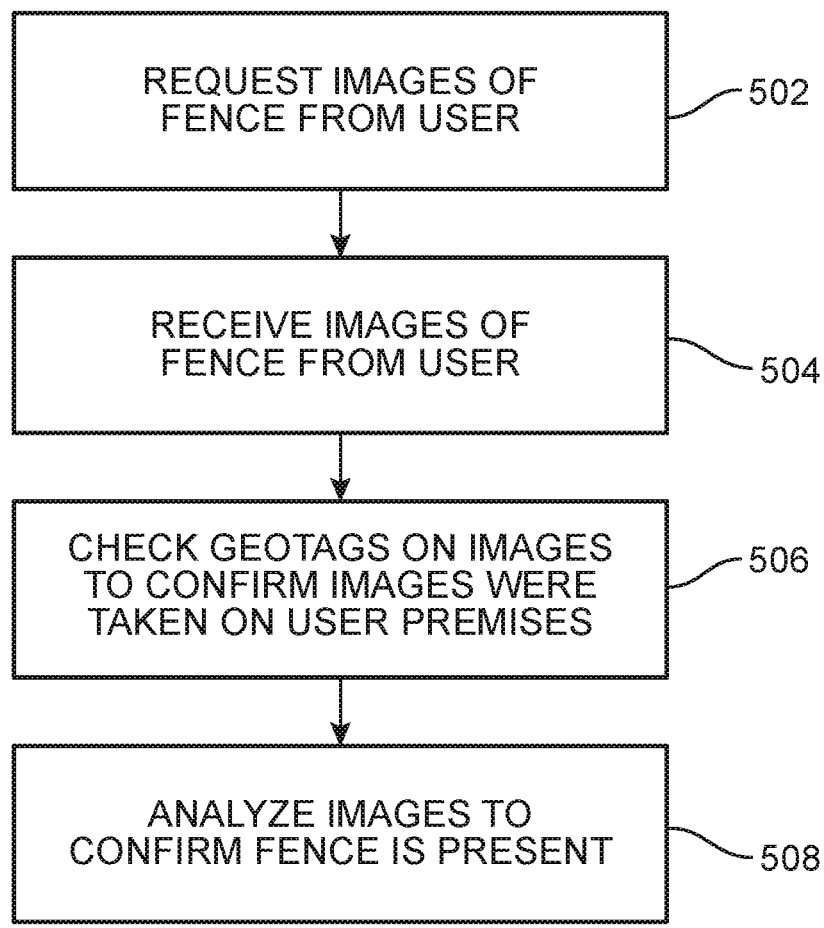
FIG. 5 is a schematic view of a process for confirming that images are taken on a premises with a known location, according to an embodiment.

FIG. 5 depicts an embodiment of a process where a user is instructed to take images in order to independently confirm that a fence is present on a premises. In step 502, the computing system (e.g., computing system 202) of a provider may send a message to a user (for example, to user device 230) requesting images of a fence, if they have one. The user could be a policy holder of an insurance policy for the premises or any other user of the premises. Next, in step 504, the computing system receives the images from the user. In an optional step 506, the computing system could check any geotag information associated with the received images to confirm if the images were taken on the premises that are covered by an associated insurance policy. The geotag information could include, for example, the approximate location where the image was taken. This location could be compared to the known location retrieved from the user's (or the policy holder's) account information. Finally, in step 508, the computing system analyzes the images to confirm if a fence is present. Depending on whether a fence is present, the system could proceed as in the process described above and shown in FIG. 4.

Figure 6:
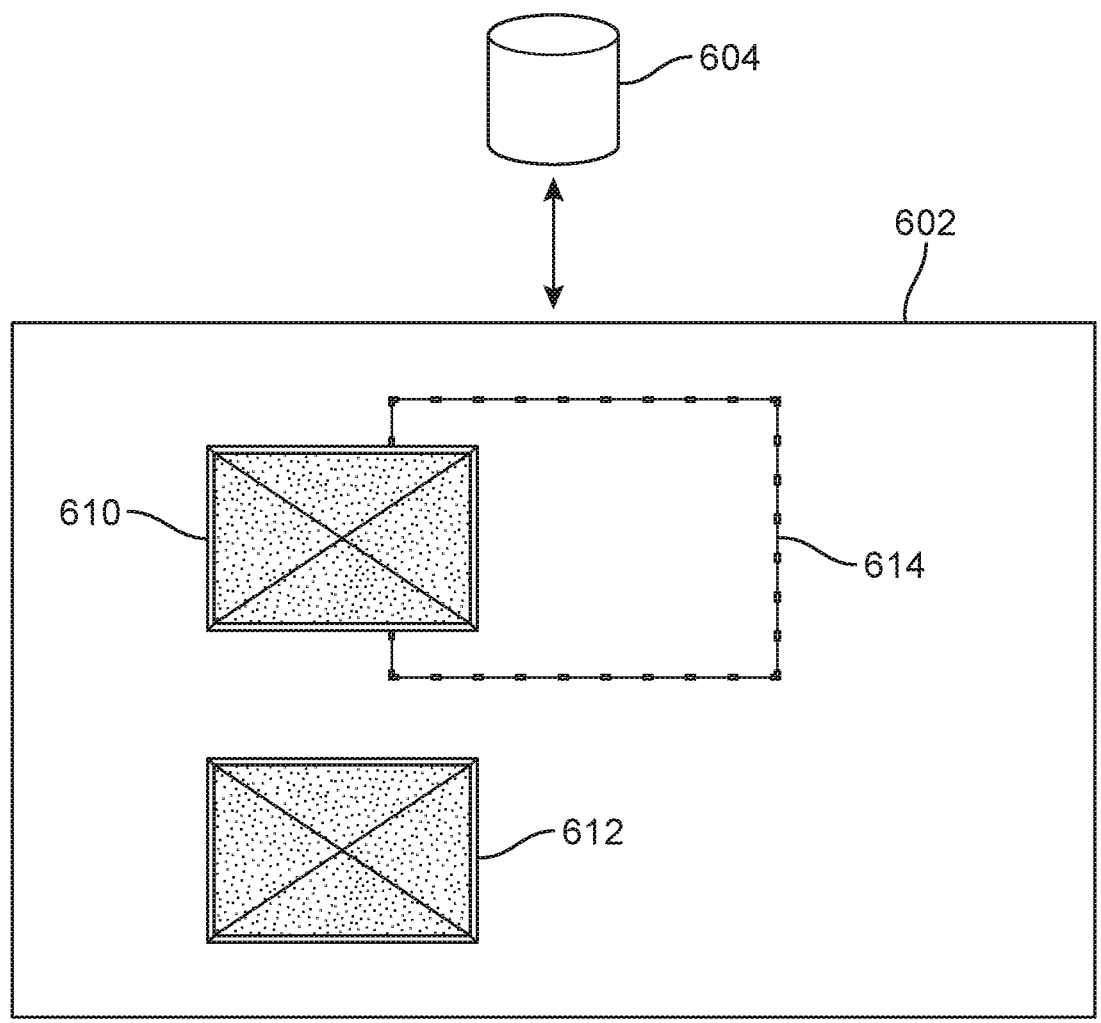
FIG. 6 is a schematic view of a configuration where satellite images are stored in satellite image databases, according to an embodiment.

FIG. 6 is a schematic view of a configuration where a system uses a satellite image 602 from a satellite image database 604 to detect the presence of a fence on a premise, according to an embodiment. In the exemplary image 602, two houses (first house 610 and second house 612) are visible as viewed from above. In addition, a fence 614 around first house 610 can also be seen.

Figure 7:
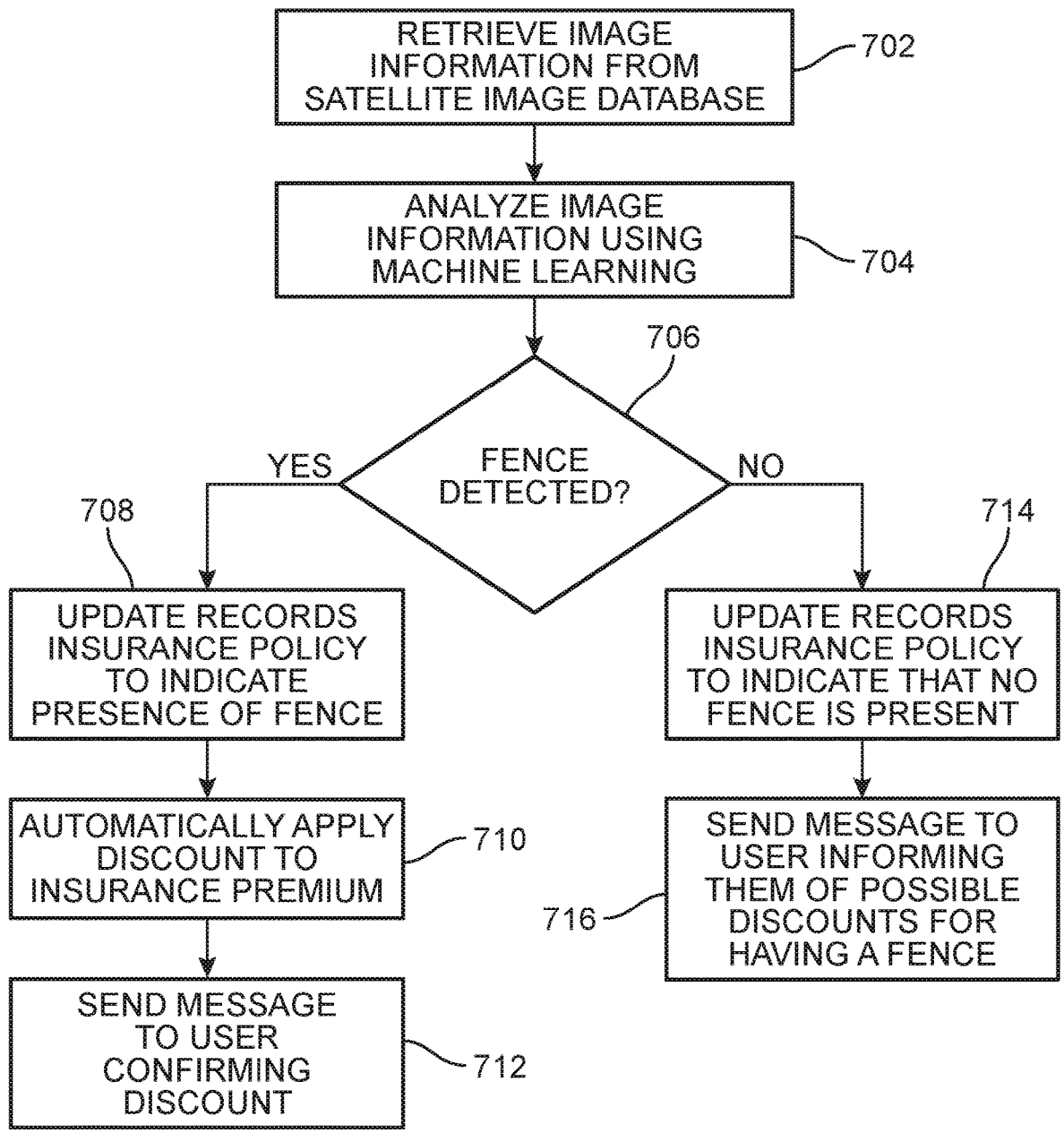
FIG. 7 is a schematic view of a process for gather images from a satellite image database and processing the images to detect fences, according to an embodiment.

FIG. 7 is a schematic process for automatically determining if a premises has a fence and updating an insurance policy accordingly. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

The method depicted in FIG. 7 may be similar in many respects to the method shown in FIG. 4 for detecting fences using ground-based images. In contrast to the previous method, however, the current method uses satellite based images for detecting fences. Specifically, in step 702 a computing system may retrieve image information from a satellite images database. For example, the computing system could access a satellite images database (e.g., satellite images database 240 of FIG. 2) over a network (e.g., network 206). In order to determine which images to use, a system may look up the address of the premises, which may generally be stored by the provider on a database of computing system (e.g., databases 212).

Next, in step 704, image information could be analyzed using one or more machine learning algorithms. These algorithms can include any of the algorithms discussed above for classifying objects in images. It may be appreciated that the task of identifying a fence in overhead images (such as satellite images) may be distinct from the task of identifying a fence in ground-based images. This distinction can be clearly seen by comparing the appearance of fence 306 in ground based image 308 of FIG. 3 with the appearance of fence 614 in satellite image 602 of FIG. 6. This difference in appearance is a result of the different perspectives (and distances) of the ground based vs. satellite based imaging methods. It may therefore be appreciated that while similar machine learning algorithms may be used to identify fences from ground based and satellite based images, the algorithms may be trained differently and may converge on different learning parameters.

In step 706, the computing system determines if a fence has been detected and may output a fence classification parameter as described above. At this point, the remainder of the process may proceed in a similar manner to the process described above and shown in FIG. 4. Specifically, if a fence is detected, step 708, step 710 and step 712 may proceed similarly to step 408, step 410 and step 412 of the above process. Likewise, if a fence is not detected, step 714 and step 716 may proceed similarly to step 414 and step 416 of the above process.

Some embodiments may be configured so that either ground based images or satellite images could be used. In some cases, a system may check to see if ground based images are available. If not, the system may proceed to using satellite images.

Figure 8:
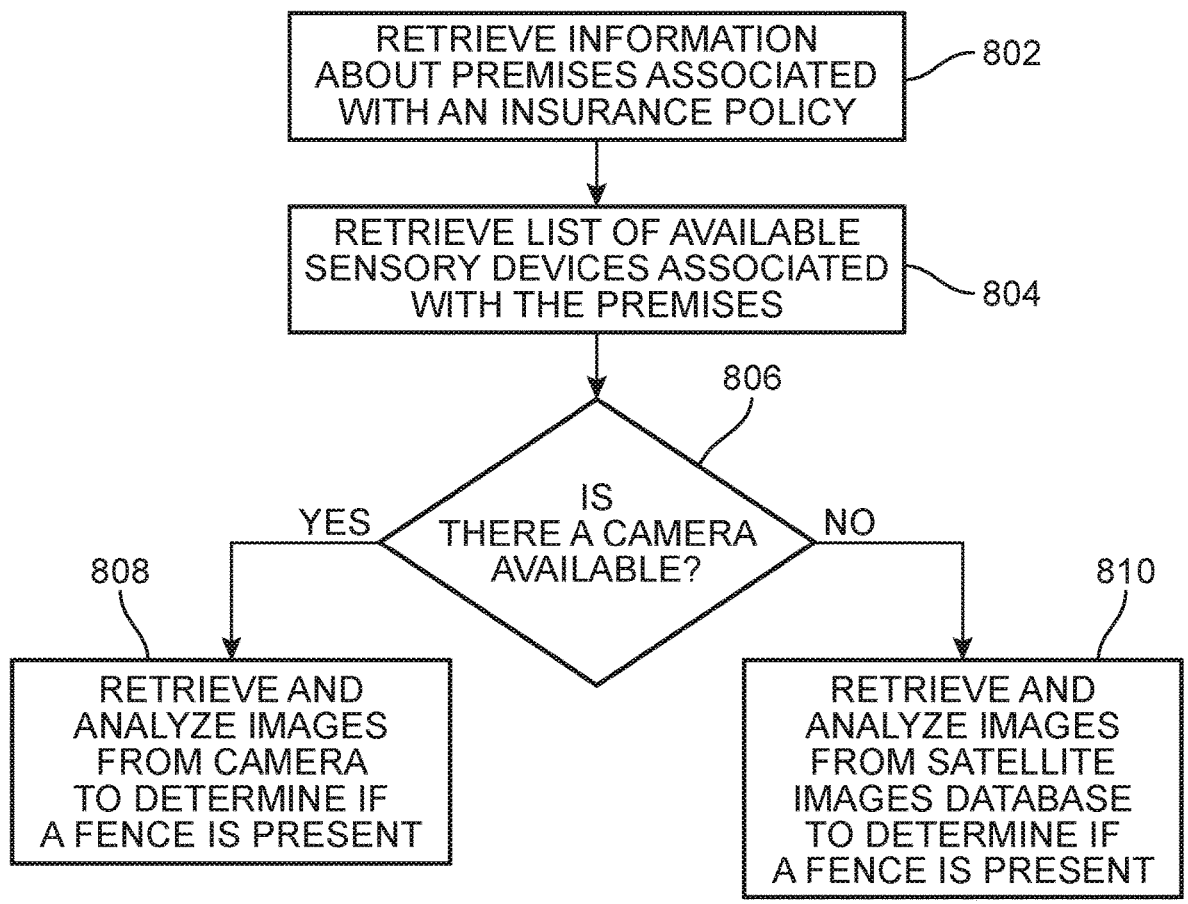
FIG. 8 is a schematic view of a process for selectively choosing a source of data for analyzing images, according to an embodiment.

FIG. 8 depicts a process wherein a system first checks to see if satellite images are available before using ground based images. In step 802, the computing system may retrieve information about the premises associated with an insurance policy. Next, in step 804, the computing system may retrieve a list of available sensory devices. This list may be populated when an insurance policy associated with the premises is first set-up, or at some later time. In step 806, the computing system determines if a camera is available (that is, the system determines if there is a camera on the list of available sensory devices). If so, the system proceeds to retrieve and analyze images from the camera in step 808, to determine if a fence is present. Otherwise, in step 810, the system retrieves images from a satellite images database and analyzes those images to determine if a fence is present.

Though not depicted in the figures, in an alternative embodiment the process of FIG. 8 could be modified so that the system defaults to using satellite images when they are available. Such an embodiment may be useful when the provider is interested not only in detecting the presence of a fence, but also its extension and coverage around the premises. Since ground based cameras may be limited in how much of a fence they can see, satellite images may be more useful for identifying the how much of the premises are enclosed by a fence.

Some embodiments may utilize information from both ground based images and satellite images to detect a fence. By using two different data sources, the results of the analysis may be more reliable.

Figure 9:
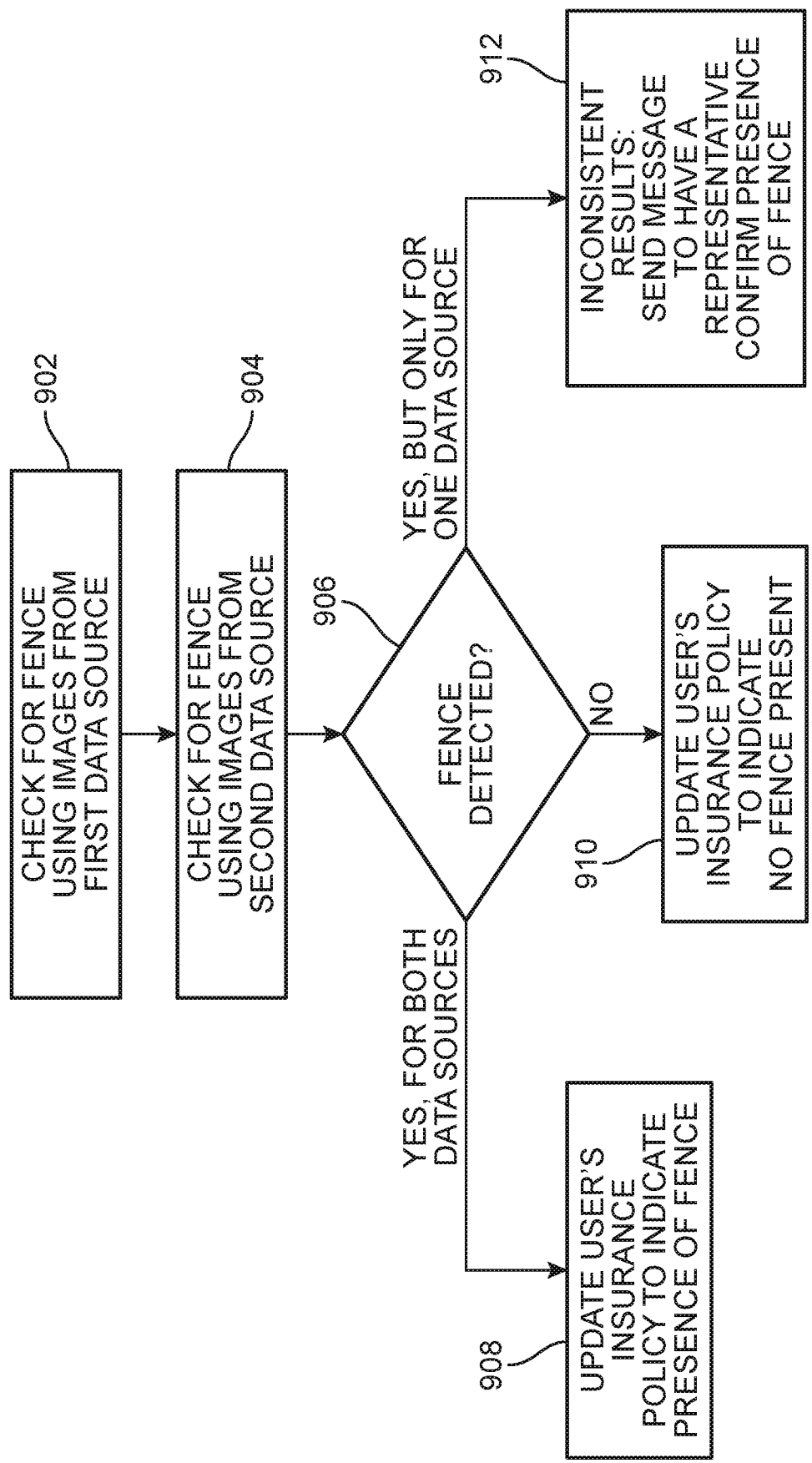
FIG. 9 is a schematic view of a process for using two different data sources to increase the reliability of detection, according to an embodiment.

Referring to the process of FIG. 9, in a step 902, the computing system may check to see if a fence is detected based on images from a first data source. In a step 904, the computing system may check to see if a fence is detected based on images from a second data source. It may be appreciated that step 902 and step 904 could occur in sequence or in parallel. Moreover, in one embodiment, the first data source is satellite images and the second data source is images from a ground-based camera.

In step 906 the computing system checks to see if a fence has been detected by analyzing the two different data sources. If analyses of both data sources indicate that a fence is present, the computing system proceeds to step 908 to update the insurance policy records associated with the premises to indicate the presence of a fence. If analysis of both data sources indicate that no fence is present, the computing system proceeds to step 910 to update the insurance policy records to indicate that no fence is present. In the case where analyses of the two data sources are in conflict (that is, one says a fence is present and the other says no fence is present), the computing system may proceed to step 912. In step 912 the computing system determines that the results of the analyses are inconsistent. In some cases, the computing system may send a message to a representative or other employee of the insurance provider to have the presence of the fence manually confirmed, for example, by having a representative visit the premises or request photos from the policy holder.

Figure 10:
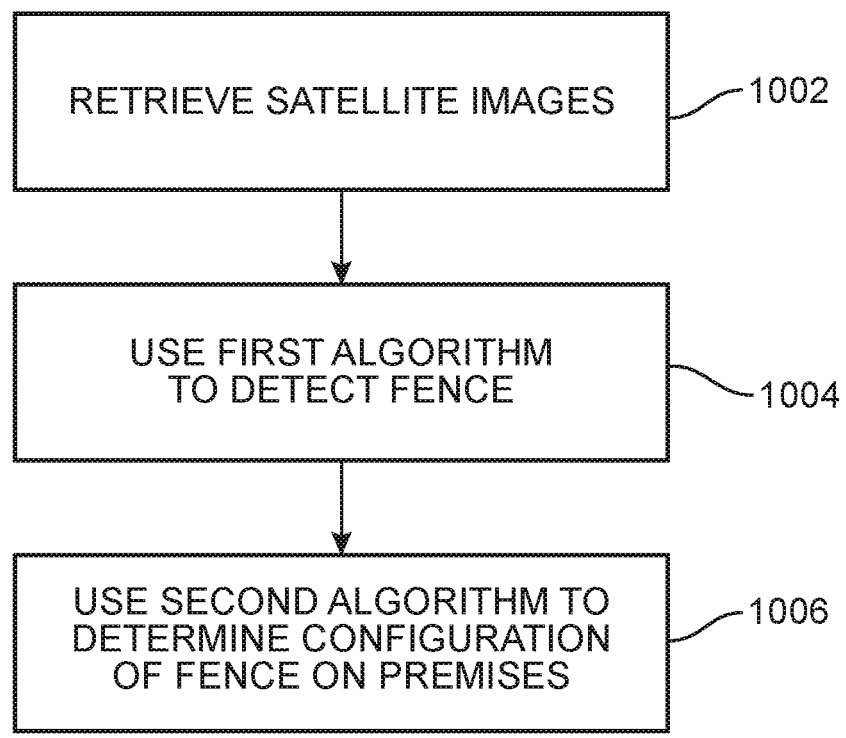
FIG. 10 is a schematic view of a process for detecting a fence and also determining its layout on a premises, according to an embodiment.

FIG. 10 is a schematic view of a process for analyzing images to determine if a fence is present and, also, the configuration of the fence. In a first step 1002, a computing system may retrieve satellite images. In a second step 1004, the computing system may use a first algorithm to detect a fence in the images. In some cases, this first algorithm could be a machine learning classification algorithm that outputs a classification of fence/no-fence, or a probability that a fence has been detected. After this, in step 1006, the computing system may use a second algorithm to determine the configuration of the fence on the premises. Here the configuration of the fence refers to how the fence is laid out in space on the premises.

Figure 11:
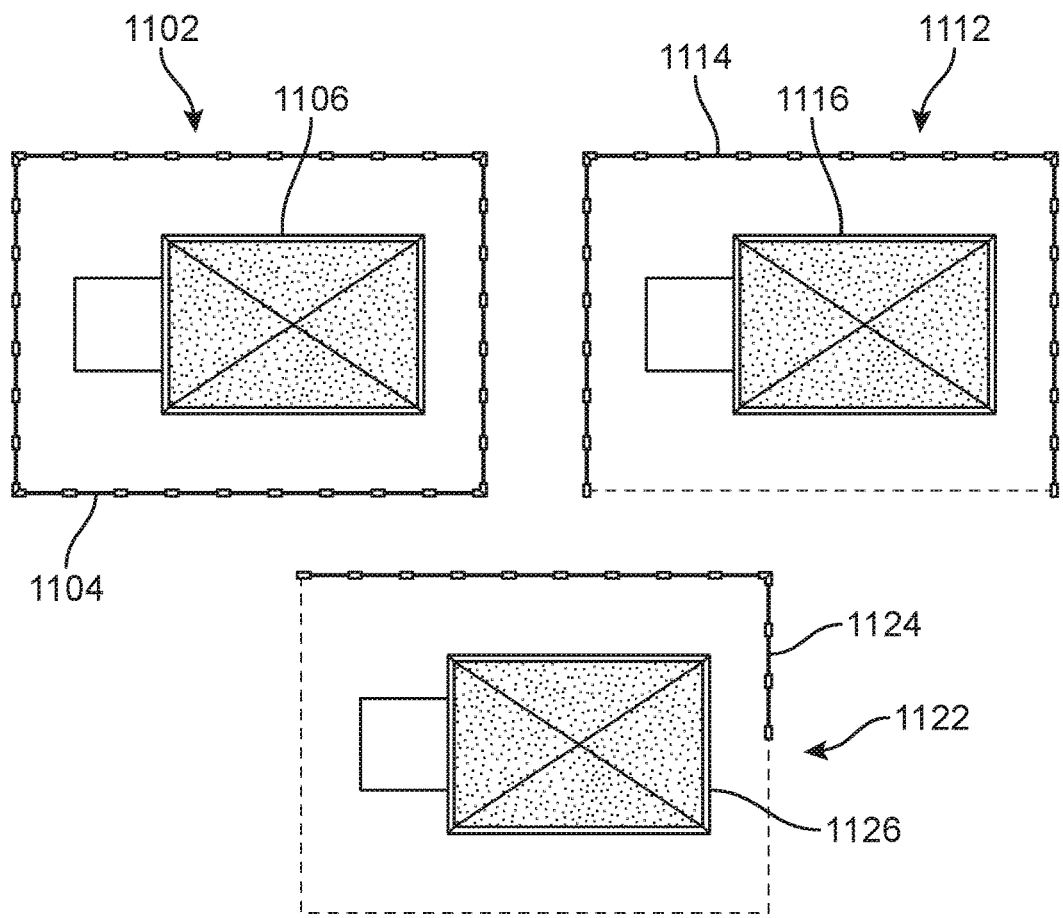
FIG. 11 is a schematic view of several possible fence layouts, ranging from full enclosure of a premises to partial enclosure, according to an embodiment.

Examples of different fence configurations are shown in the exemplary images of FIG. 11. For example, a first image 1102 depicts a fence 1104 that fully encloses a premises 1106. That is, fence 1104 fully encloses a region of premises 1106 such that access to this region requires passing through the fence (or adjacent building). By contrast, a second image 1112 depicts a fence 1114 that only partially encloses a premises 1116. In this case, fence 1114 covers three sides of premises 1116, but not a fourth. In the third image 1122, fence 1124 covers only one full side of a premises 1126, as well as another partial side of premises 1126. In some embodiments, knowing the configuration of a fence, or degree of coverage around a premises, allows a provider to apply premium discounts in a more discretionary manner. For example, the fence 1124 shown in image 1122 may not be a substantial deterrent to theft or other liabilities, and therefore a provider may not offer a discount to a policy holder even though they have a partial fence. By contrast, a provider may determine that fence 1114 of second image 1112 is sufficiently large enough to provide a substantial deterrent against theft or other liabilities. In this case, then the provider could opt to give the policy holder a discount.

To detect and/or classify fences in images, the embodiments may utilize a machine learning system. As used herein, the term "machine learning system" refers to any collection of one or more machine learning algorithms. Some machine learning systems may incorporate various different kinds of algorithms, as different tasks may require different types of machine learning algorithms. Generally, a machine learning system will take input data and output one or more kinds of predicted values. The input data could take any form including image data, text data, audio data or various other kinds of data. The output predicted values could be numbers taking on discrete or continuous values. The predicted values could also be discrete classes (for example, a "fence" class and an "no fence" class). Numerical outputs could represent the probabilities that the input belongs to various classes. Moreover, it may be appreciated that the same machine learning system can be used for training, testing and deployment, in some cases.

Figure 12:
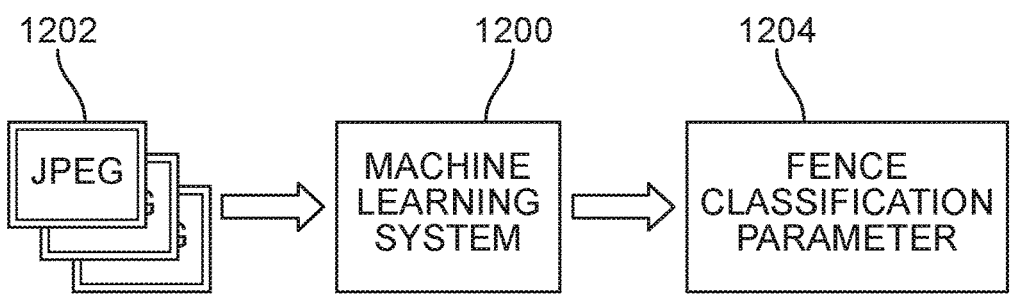
FIG. 12 is a schematic view of a configuration for training a machine learning system to detect fences.

Referring to FIG. 12, a machine learning system 1200 may be used to detect and/or classify fences. In the example of FIG. 12, machine learning system 1200 is trained on input data 1202. Input data 1202 comprises various images of premises with fences as well as images without fences. The output of machine learning system 1200 is fence classification parameter 1204.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of analyzing images of a premises by a computing device to determine whether a fence is present at the premises, the method comprising:
    retrieving, at the computing device, at least one image of the premises captured from a camera disposed proximally to the premises;
    comparing, by the computing device, geotag information associated with the at least one image of the premises to a known location of the premises retrieved from an insurance policy associated with the premises;
    upon confirming that the geotag information matches the known location of the premises, analyzing the at least one image of the premises using a machine learning system, wherein an output of the machine learning system includes a fence classification parameter;
    determining, by the computing device, whether or not the premises has a fence based on the fence classification parameter; and
    wherein, upon determining that a fence is present at the premises, modifying the insurance policy associated with the premises in response.

2. The method according to claim 1, wherein the camera is a security camera.

3. The method according to claim 1, wherein the camera is part of a smartphone.

4. The method according to claim 1, wherein modifying the insurance policy includes reducing an insurance premium for the insurance policy when a fence is determined to be at the premises.

5. The method according to claim 1, wherein the method further includes sending a policy holder of the insurance policy a message indicating that the insurance policy has been modified.

6. The method according to claim 1, wherein the method further includes:
    upon determining that a fence is present at the premises, further analyzing the at least one image of the premises by the machine learning system to determine a configuration of the fence on the premises.

7. The method according to claim 1, wherein the method includes a step of training the machine learning system using a first set of images including fences and a second set of images without fences.

8. The method according to claim 6, wherein determining the configuration of the fence includes determining whether or not the fence fully encloses a region of the premises.

9. The method according to claim 8, further comprising:
    upon determining that the fence does not fully enclose a region of the premises, modifying the insurance policy associated with the premises so as to not provide a discount for having a fence.

10. The method according to claim 8, further comprising:
    upon determining that the fence does fully enclose a region of the premises, modifying the insurance policy associated with the premises so as to provide a discount for having a fence.

11. The method according to claim 1, further comprising:
    retrieving, by the computing device, at least one image of the premises from a satellite images database;
    analyzing the at least one image of the premises from the satellite images database using the machine learning system to determine whether or not the premises has a fence; and
    updating the insurance policy associated with the premises to indicate a fence is present only when the presence of the fence is determined from both (1) the at least one image captured by the camera, and (2) the at least one image from the satellite images database.

12. A method of analyzing images of a premises by a computing device to determine whether a fence is present at the premises, the method comprising:
    retrieving at least one image of the premises from a satellite images database, the at least one image corresponding to an overhead view of the premises;
    analyzing the at least one image of the premises using a machine learning system, wherein an output of the machine learning system includes a fence classification parameter;

determining, by the computing device, whether or not the premises has a fence based on the fence classification parameter;

retrieving at least one image of the premises captured from a camera disposed proximally to the premises;

analyzing the at least one image of the premises captured from the camera using the machine learning system to determine whether or not the premises has a fence; and modifying the insurance policy associated with the premises to indicate a fence is present only when the presence of the fence is determined from both (1) the at least one image from the satellite images database, and (2) the at least one image captured by the camera.

13. The method according to claim 12, wherein the method includes a step of retrieving information about the insurance policy and determining if the insurance policy indicates that the property has a fence.

14. The method according to claim 12, wherein the method includes sending a message to an owner of the insurance policy, the message including information about adjusting the insurance policy.

15. The method according to claim 12, wherein the fence classification parameter represents a classification in one of a fence class or a no fence class.

16. The method according to claim 12, wherein the fence classification parameter represents a probability that a fence has been detected.

17. The method according to claim 12, wherein the method includes training the machine learning system using a training set of images, the training set of images including a first set of images including fences and a second set of images without fences.

18. The method according to claim 12, further comprising:

comparing, by the computing device, geotag information associated with the at least one image of the premises captured by the camera to a known location of the premises retrieved from an insurance policy associated with the premises.

19. The method according to claim 12, wherein the method further includes:

upon determining that a fence is present at the premises, further analyzing the at least one image of the premises from the satellite images database and/or the at least one image captured by the camera by the machine learning system to determine a configuration of the fence on the premises.

20. The method according to claim 19, wherein determining the configuration of the fence includes determining whether or not the fence fully encloses a region of the premises; and upon determining that the fence does not fully enclose a region of the premises, modifying the insurance policy associated with the premises so as to not provide a discount for having a fence; or upon determining that the fence does fully enclose a region of the premises, modifying the insurance policy associated with the premises so as to provide a discount for having a fence.

* * * * *